(12) United States Patent
Nix et al.

(10) Patent No.: US 6,742,643 B2
(45) Date of Patent: Jun. 1, 2004

(54) ELASTOMERIC DAMPER FOR HYDRAULIC CLUTCH ACTUATOR

(75) Inventors: Richard A. Nix, Ortonville, MI (US); Michael James Woodard, Utica, MI (US); Timothy M. Dangel, Oxford, MI (US)

(73) Assignee: Automotive Products (USA), Inc., Auburn Hills, MI (US)

( * ) Notice: Subject to any disclaimer, the term of this patent is extended or adjusted under 35 U.S.C. 154(b) by 0 days.

(21) Appl. No.: 10/215,632

(22) Filed: Aug. 8, 2002

(65) Prior Publication Data

US 2004/0026208 A1 Feb. 12, 2004

(51) Int. Cl.$^7$ ................................................ F16L 55/04
(52) U.S. Cl. ................. 192/109 F; 60/469; 92/43; 192/30 V
(58) Field of Search ................. 192/109 F, 30 V, 192/88 R, 88 A, 88 B; 92/43, 60; 138/30; 60/592, 469

(56) References Cited

U.S. PATENT DOCUMENTS

| | | | | |
|---|---|---|---|---|
| 2,695,037 A | * | 11/1954 | McCuistion | ............ 92/60 |
| 3,090,201 A | * | 5/1963 | May | ............ 60/592 |
| 3,333,604 A | * | 8/1967 | Birdwell | ............ 138/30 |
| 4,427,029 A | * | 1/1984 | Charney et al. | ............ 138/30 |
| 4,998,609 A | | 3/1991 | Nix et al. | |
| 5,070,983 A | | 12/1991 | Leigh-Monstevens et al. | |
| 5,320,203 A | | 6/1994 | Wilber et al. | |
| 6,148,614 A | | 11/2000 | Nix et al. | |
| 6,430,928 B1 | * | 8/2002 | Iyer et al. | ............ 60/592 |

FOREIGN PATENT DOCUMENTS

| | | | |
|---|---|---|---|
| DE | 37 33 189 A1 | * | 4/1989 |
| EP | 1 318 345 A2 | * | 6/2003 |
| FR | 2 655 128 B1 | * | 5/1991 |
| GB | 1089667 | | 11/1967 |
| GB | 1562709 | | 3/1980 |
| GB | 2266341 | | 8/1991 |

* cited by examiner

Primary Examiner—Rodney H. Bonck
(74) Attorney, Agent, or Firm—Young & Basile P.C.

(57) ABSTRACT

A hydraulic clutch actuator system having a vibration damper in the system including an elastomeric diaphragm and a steel diaphragm. One face of the elastomeric diaphragm is in communication with fluid in the system so that the diaphragm may deflect in response to low frequency system vibrations to effect damping of these vibrations. The steel diaphragm is positioned generally parallel to and proximate the other face of the elastomeric diaphragm so as to form a back-up for the elastomeric diaphragm so that the elastomeric diaphragm may deform against the steel diaphragm in response to high frequency system vibrations to cause deflection of the steel diaphragm to effect damping of the high frequency vibrations. An apertured stop structure above the elastomeric diaphragm functions to limit upward excursions of the elastomeric diaphragm and further functions to maintain communication between the chamber above the elastomeric diaphragm and the damper port to the system.

20 Claims, 4 Drawing Sheets

ELASTOMERIC DAMPER FOR HYDRAULIC CLUTCH ACTUATOR

BACKGROUND OF THE INVENTION

This invention relates to hydraulic clutch actuators and more particularly to hydraulic clutch actuators employing a damper mechanism.

Hydraulic actuators are known for operating a mechanism at a remote location by way of a master cylinder connected to a slave cylinder installed at the remote location. A conduit interconnects the master cylinder to the slave cylinder and the hydraulic apparatus is filled with hydraulic fluid such that, when the piston of the master cylinder is actuated, the piston of the slave cylinder and consequently the piston rod or output member is simultaneously actuated by displacement of the hydraulic fluid from the master cylinder to the slave cylinder through the conduit.

More particularly, it is known to provide such a hydraulic actuator for operating the clutch of a motor vehicle so that, when the clutch pedal of the vehicle is depressed by the driver, the slave cylinder is actuated to operate the clutch in known manner. Preferably, as described in U.S. Pat. No. 4,599,860 assigned to the assignee of the present application, the clutch actuator is provided to the motor vehicle manufacturer in an assembled pre-filled form to simplify installation of the actuator on the vehicle, avoid the inconvenience of potential spillage of hydraulic fluid during on-line filling, eliminate the necessity to bleed or purge the lines of the actuator to facilitate the filling process, and eliminate the need to test the actuator after installation and filling. Whereas hydraulic clutch actuators, and particularly pre-filled clutch actuators, have enjoyed significant commercial success, they have the ability to transmit vibrations backwardly through the system from the clutch to the clutch pedal with the result that the operator may experience unpleasant vibrations at the clutch pedal.

Specifically, imbalances in the crank shaft of the vehicle engine or engine firing impulses are transmitted to the flywheel which undergoes a swashing movement, the flywheel swashing movement in turn leads to vibrations of the spring fingers of the clutch release mechanism, the vibrations of the spring fingers are transferred to the release bearing of the clutch, and the vibrations propagate backwardly through the hydraulic fluid in the slave cylinder, through the hydraulic fluid in the conduit interconnecting the slave cylinder and the master cylinder, through the hydraulic fluid in the master cylinder, and then through the master cylinder pushrod to the clutch pedal where they are experienced by the operator as vibrations of the clutch pedal. The propagated vibrations also generate a pedal growl which is audible to the operator as well as a clutch roar which may also be audible to the operator.

Various devices have been proposed in an attempt to attenuate these vibrations. For example, tuned masses have been attached to various parts of the clutch system including the clutch release lever, the slave cylinder pushrod, and the clutch pedal; rubber dampers have been employed in the master cylinder pushrod; rubber hose sections have been employed in the conduit interconnecting the master cylinder and the slave cylinder; and various damper devices have been proposed for installation in the interconnecting conduit. For example, a damper device as shown in British Patent Specification 1,562,709 or as shown in U.S. Pat. Nos. 4,998,609 or 5,320,203, all assigned to the assignee of the present invention, may be installed in the conduit interconnecting the master cylinder and the slave cylinder. More recently, and as shown in co-pending U.S. patent application Ser. No. 09/620,436 assigned to the assignee of the present invention, an elastomeric diaphragm has been proposed for use with a further spring steel diaphragm to provide a dual action diaphragm wherein the elastomeric diaphragm damps low frequency vibrations in the system and the elastomeric diaphragm deforms against the spring steel diaphragm to damp high frequency vibrations in the system. Whereas this dual action damper has been successful in damping both low frequency and high frequency vibrations in the system, the use of a stretchable elastomeric diaphragm has complicated the evacuating and filling operations necessary to prepare the damper for use in the hydraulic system and specifically has resulted in situations where the elastomeric diaphragm is stretched beyond its elastic limit during the evacuation operation and/or the damper is not fully evacuated and consequently is subsequently not fully filled.

SUMMARY OF THE INVENTION

This invention is directed to the provision of an improved damper device for use in association with a hydraulic clutch actuator.

More particularly, this invention is directed to the provision of an improved damper device which eliminates the evacuating and filling problems previously encountered with the use of a stretchable elastomeric diaphragm.

This invention relates to a damper for provision in a hydraulic actuator system between the master cylinder and a slave cylinder of the system. The damper includes a housing including a damper port for connection in the system and a diaphragm carried by the housing and coacting with the housing to define a chamber above the diaphragm and in communication with the damper port so that the diaphragm may deflect in response to vibrations transmitted through the hydraulic fluid in the system to effect damping of the vibrations.

According to the invention, the diaphragm is formed of an elastomeric material; the damper further includes a stop structure positioned in the chamber in confronting relation to the diaphragm and operative to limit upward excursions of the diaphragm into the chamber to excursions within the elastic limit of the diaphragm, and the stop structure includes aperture means providing communication between the port and the chamber irrespective of the position of the diaphragm relative to the stop structure. This arrangement precludes permanent stretching of the diaphragm during the evacuation and filling operations and allows total evacuation of the chamber and subsequent total filling of the chamber.

According to a further feature of the invention, the stop structure comprises a tube communicating at an upper end thereof with the damper port, extending downwardly into the chamber, and including a free lower end positioned proximate the diaphragm, and the aperture means includes apertures in the tube communicating the interior of the tube with the chamber. This arrangement maintains communication between the port and the chamber even with the elastomeric diaphragm pulled upwardly into a position closing the free end of the tube.

According to a further feature of the invention, the damper further includes a plurality of circumferentially spaced ribs extending radially outwardly from the tube and each defining a lower edge substantially level with the free lower end of the tube. This arrangement serves to further limit upward excursions of the diaphragm and further preclude permanent stretching of the diaphragm during the evacuation operation.

According to a further feature of the invention, the damper comprises a dual action damper wherein the elastomeric diaphragm deflects in response to the low frequency vibrations transmitted through the hydraulic fluid in the system to effect damping of low frequency vibrations, and the damper includes a further relatively stiff diaphragm carried by the housing and positioned proximate a lower face of the elastomeric diaphragm so as to form a back up to the elastomeric diaphragm. With this arrangement the elastomeric diaphragm may deform against the further diaphragm in response to high frequency vibrations transmitted through the hydraulic fluid to cause deflection of the further diaphragm to effect damping of the high frequency vibrations.

According to a further feature of the invention, the aperture means includes a plurality of circumferentially spaced apertures in the tube proximate the lower end of the tube with each aperture comprising a downwardly opening slot formed in the lower end of the tube between adjacent ribs. This specific construction provides a positive limit of upward excursion with respect to the entirety of the elastomeric diaphragm and allows total evacuation of the chamber above the diaphragm preparatory to the filling operation.

Other objects, advantages and applications of the present invention will become apparent to those skilled in the art when the following description of the best modes contemplated for practicing the invention are read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENTS

Figure 1:
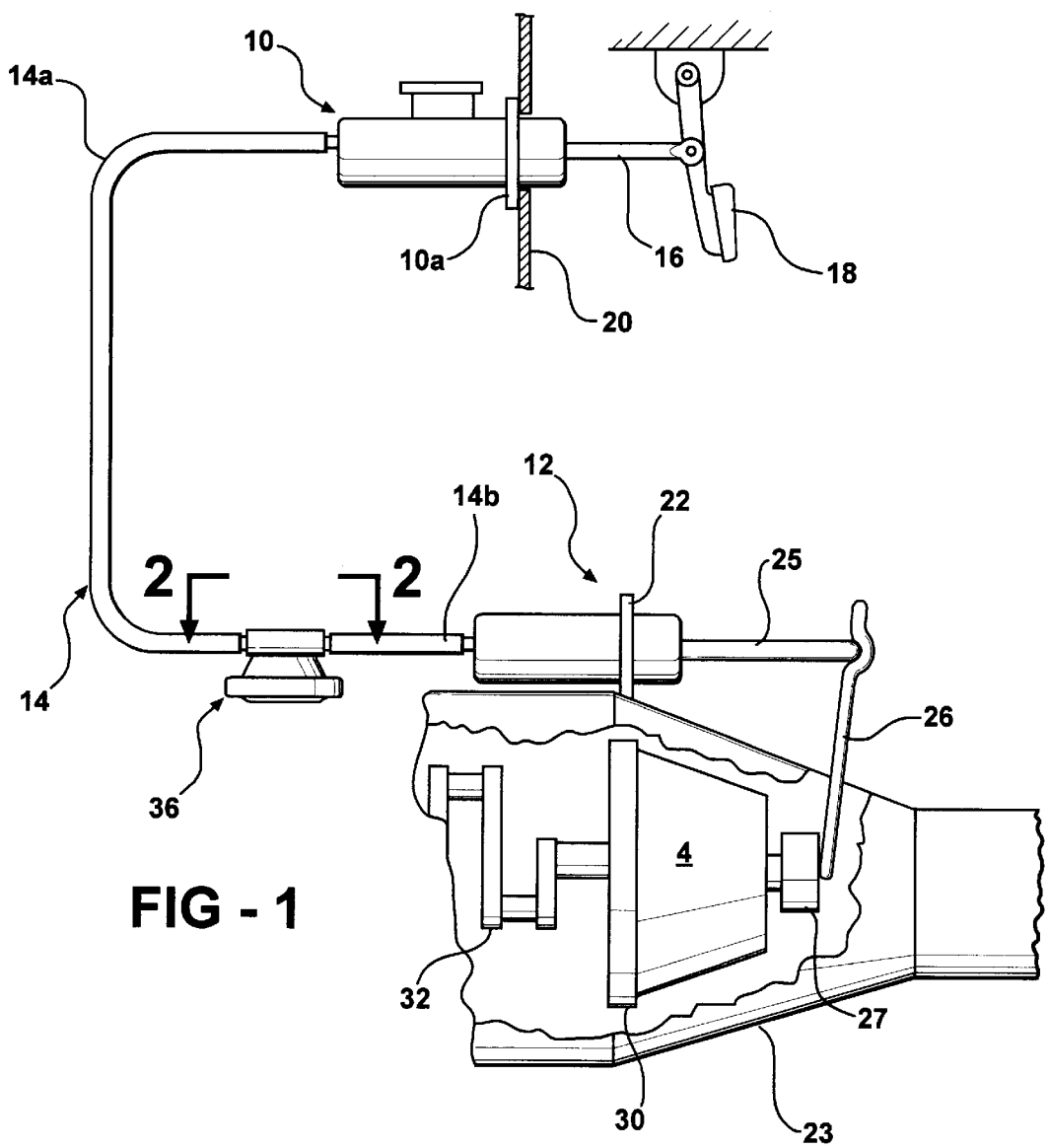
FIG. 1 is a somewhat schematic view of a hydraulic clutch actuator employing the invention damper.
Figure 2:
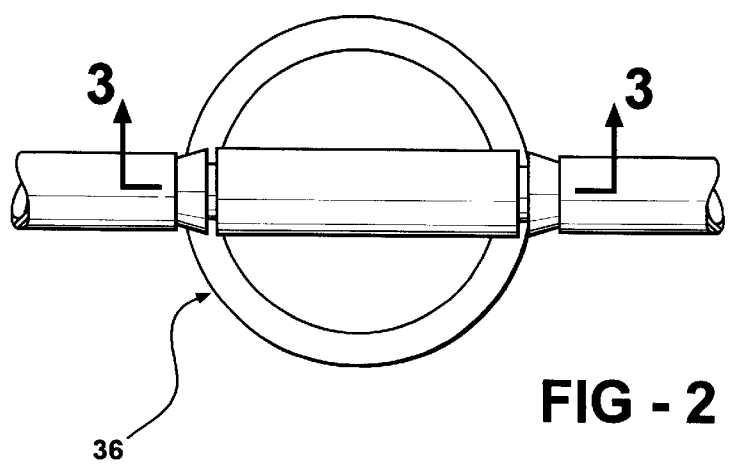
FIG. 2 is a fragmentary view of the invention damper looking in the direction of the arrow 2—2 in FIG. 1.

The hydraulic clutch actuator shown schematically in FIG. 1 includes a master cylinder 10, a slave cylinder 12, and a conduit 14 extending between the outlet or discharge of the master cylinder and the inlet of the slave cylinder.

Master cylinder 10 includes an input rod 16 connected in known manner to the clutch pedal 18 of an associated motor vehicle so that pivotal movement of the clutch pedal by the vehicle operator moves a piston of the master cylinder in known manner to discharge pressure fluid from the cylinder. Cylinder 10 further includes a flange 10a to facilitate attachment of the master cylinder to the firewall 20 of the vehicle.

Slave cylinder 12 is secured as by a bracket 22 to the bell housing 23 enclosing the clutch 24 of the vehicle and includes an output rod 25 coacting in known manner with a clutch release lever 26 so that pivotal movement of clutch pedal 18 by the operator results in discharge or pressure fluid from master cylinder 10 for conveyance through conduit 14 to slave cylinder 12 to provide extension of output rod 25 and pivotal movement of release lever 26 to move the clutch release bearing 27 in a direction to disengage the clutch 24. Clutch 24 is driven in known manner by a flywheel 30 which in turn is driven by an engine crank shaft 32. The invention damper 36 is interposed in conduit 14 and is connected to the outlet of master cylinder 10 by a conduit portion 14a and to the inlet of slave cylinder 12 by a conduit portion 14b.

Damper 36 includes a housing 38, a relatively flexible elastomeric diaphragm 40, a relatively stiff metallic diaphragm 42, and a cover member 44.

Housing 38 is formed of a suitable plastic material such for example as a glass reinforced plastic and has a generally circular cross-sectional configuration including a main body conical portion 38a defining a damper port 38b and a downwardly opening domed chamber or cavity 38c, a male inlet fitting 38d defining an inlet port 38e communicating with damper port 38b, a male outlet fitting 38f defining an outlet port 38g communicating with damper port 38b, a stop structure 38h, and a lower flange portion 38i.

Conduit portion 14a is suitably received on male inlet fitting 38e and conduit portion 14b is suitably received on male outlet fitting 38f.

Stop structure 38h includes a tube structure 38j and a plurality of circumferentially spaced ribs 38k extending radially outwardly from tube structure 38j for integral joinder at their arcuate outer edges 38l with the wall surface of chamber 38c whereby to divide the chamber into a plurality of downwardly opening circumferentially spaced compartments centered about tube structures 38j.

Tube structure 38j communicates at an upper end thereof with the lower end of damper port 38b and defines a plurality of circumferentially spaced apertures 38m proximate the lower free end 38n of the tube structure. Each aperture 38m is in the form of a downwardly opening slot positioned between adjacent ribs 38k. The lower edges 38p of ribs 38k are substantially level with the free lower end 38n of the tube structure.

Housing flange portion 38i defines an annular downwardly opening groove 38q.

Elastomeric diaphragm 40 has a generally circular planar configuration and is formed of a suitable elastic material such as rubber. Diaphragm 40 includes an upstanding outer flange portion 40a sized to fit in housing groove 38q and a generally planar central main body portion 40b extending across the lower face of housing 38 and coacting with the housing to define chamber 38c. Diaphragm 40 will be seen to have a thin planar configuration including upper and lower parallel faces 40c and 40d and the upper face 40c of the diaphragm will be seen to form a boundary wall of the hydraulic actuator system so that the diaphragm may deflect in response to vibrations transmitted through the hydraulic fluid in the system.

Diaphragm 42 has a generally circular dished configuration and is preferably formed of spring steel. Diaphragm 42 includes a peripheral portion 42a engaging a peripheral portion of the lower face 40d of the elastomeric diaphragm and a central recess or dished portion 42b defining an upper face positioned proximate but spaced below a central portion of the lower face 40d of the elastomeric diaphragm to define a void 46.

Cover member 44 has a generally circular configuration and is preferably formed of a suitable metallic material. Cover member 44 includes a clamping ring portion 44a and a central dished portion 44b. Clamping ring portion 44a includes an upper flange 44c clampingly engaging a shoulder 38r on housing flange portion 38i and a lower flange 44d clampingly engaging the underside of the peripheral portion 42a of spring steel diaphragm 42. Clamping ring portion 44a will be seen to press diaphragm 42 upwardly against diaphragm 38 and into engagement with housing flange portion 38i whereby to press flange portion 40a of elastomeric diaphragm 40 firmly into groove 38q with central dished portion 44b underlying and spaced downwardly from the central dished portion 42b of diaphragm 42.

In operation, low frequency vibrations (for example 0–10 hertz) transmitted through the hydraulic fluid in the system to the damper have the effect of deflecting the elastomeric diaphragm 40 to effect damping of the low frequency vibrations. The damping action of the elastomeric diaphragm with respect to the low frequency vibrations has no affect on the spring steel diaphragm 42. However, in response to high frequency vibrations (for example more than 20 hertz) transmitted through the hydraulic fluid to the damper, spring steel diaphragm 42 forms a backup for the elastomeric diaphragm and, specifically, elastomeric diaphragm 40 elastically deforms against spring steel diaphragm 42 to seat the lower face 40d of the elastomeric diaphragm against the upper face of the spring steel diaphragm and cause deflection of the spring steel diaphragm whereby to effect damping of the high frequency vibrations.

It will be understood that in order to fill the damper with hydraulic fluid for use in the system it is first necessary to evacuate the damper. Typically the damper is inserted into the overall clutch actuator system prior to the evacuating and filling operations, whereafter the overall system including the damper is evacuated and thereafter filled with hydraulic fluid preparatory to shipping the hydraulic clutch actuator as a prefilled assembly to a user for use in known manner on a vehicle to operate the vehicle clutch.

Since the diaphragm 40 is made of a stretchable elastomeric material, in the absence of the stop structure 38i, the elastomeric diaphragm would tend to be sucked upwardly into the chamber 38c in response to the evacuation of the system and this upward excursion of the diaphragm into the chamber might result in straining of the diaphragm to a point beyond its elastic limit with the result that the diaphragm would be permanently stretched and would no longer be useable in the damper for its intended damping function.

Figure 3:
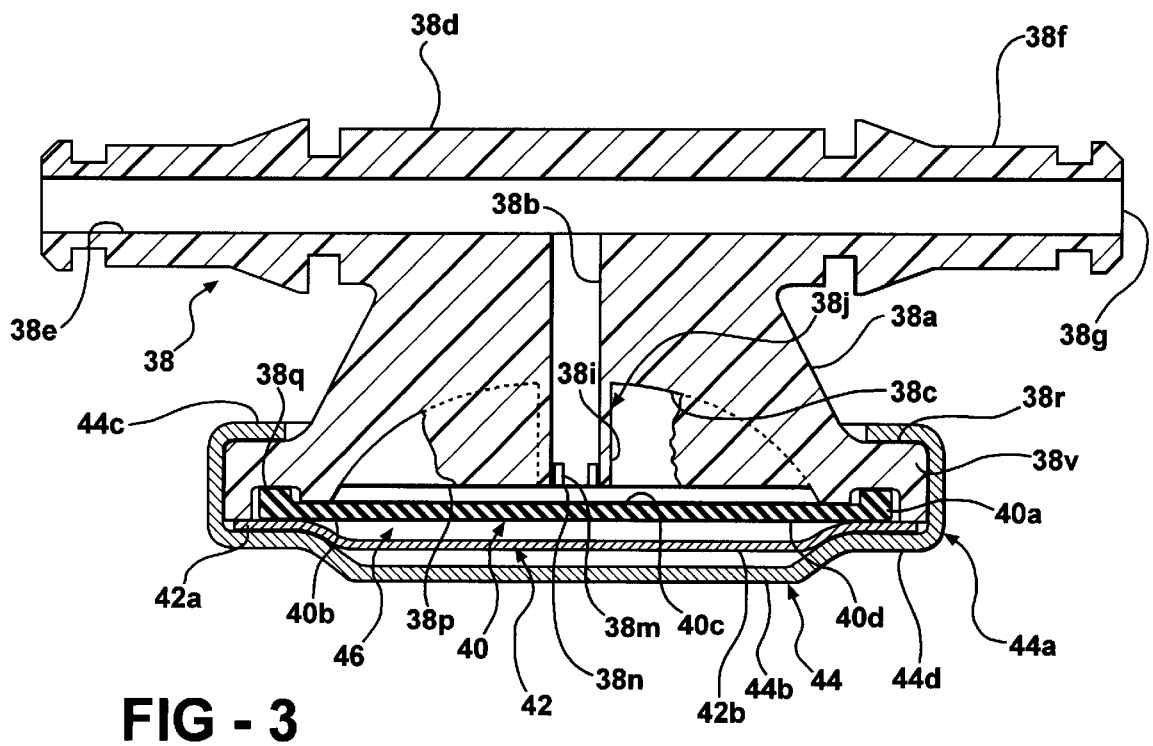
FIG. 3 is a cross-sectional view taken on line 3—3 of FIG. 2.
Figure 4:
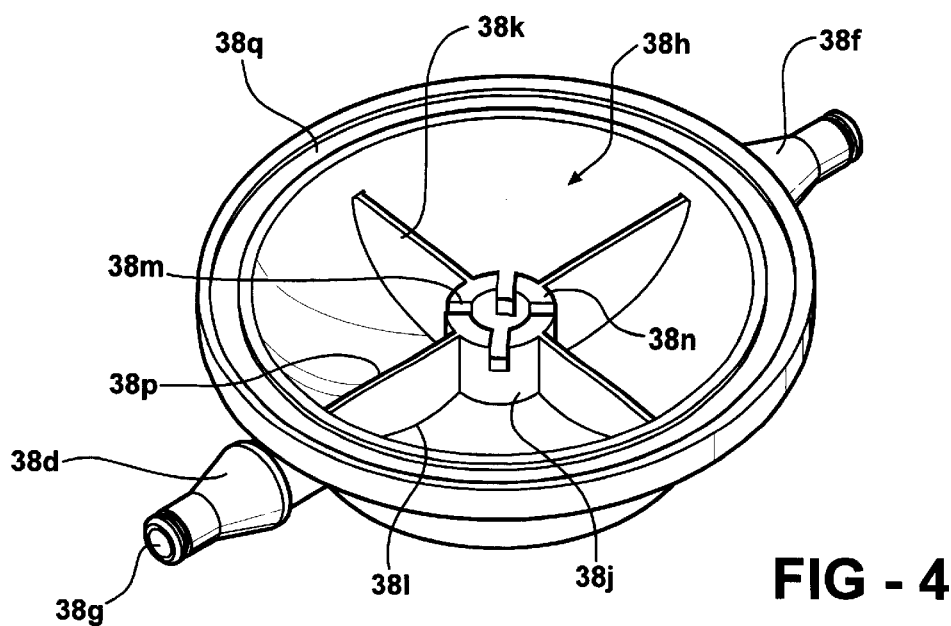
FIG. 4 is a perspective view of the invention damper.
Figure 5:
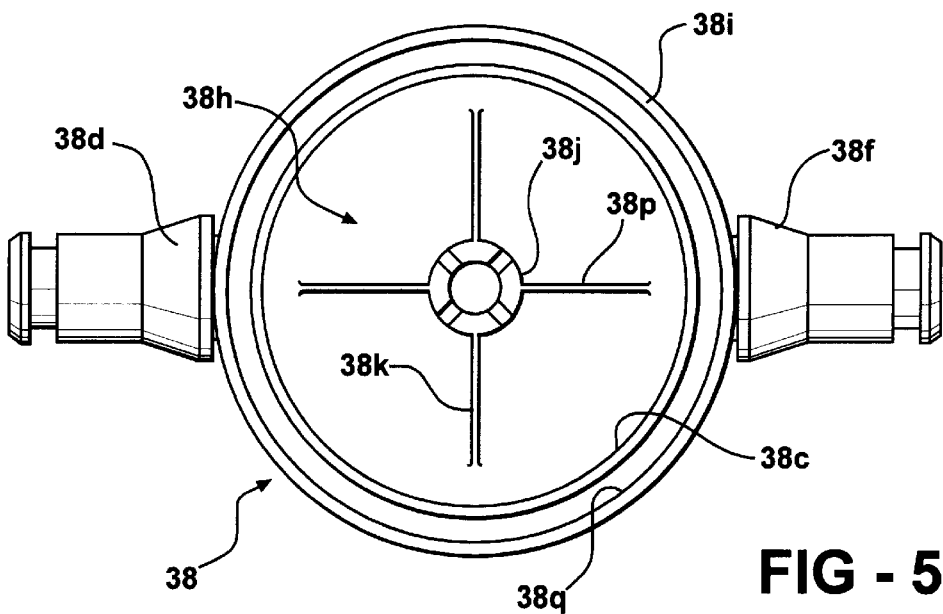
FIGS. 5, 6 and 7 are bottom, transverse cross-sectional, longitudinal cross-sectional views of a housing utilized in the invention damper.
Figure 6:
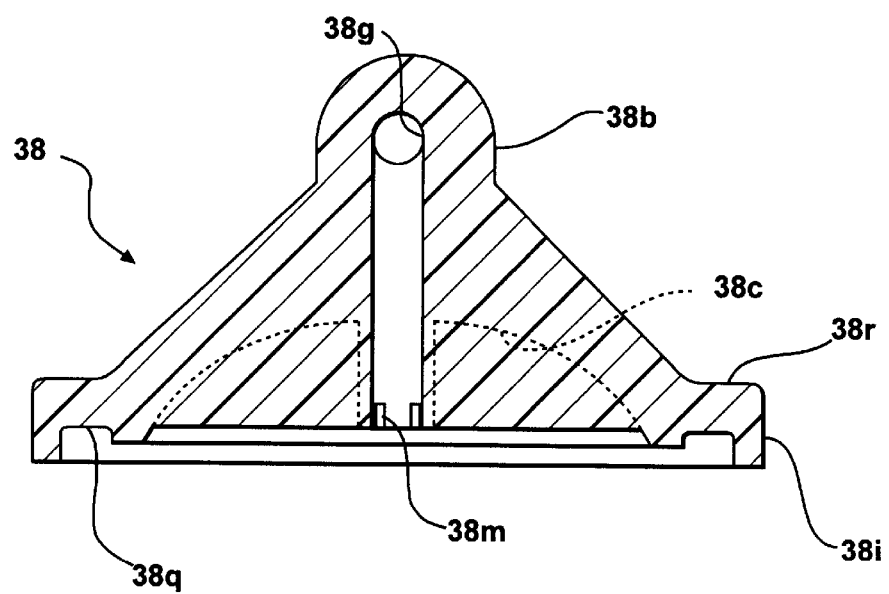
Figure 7:
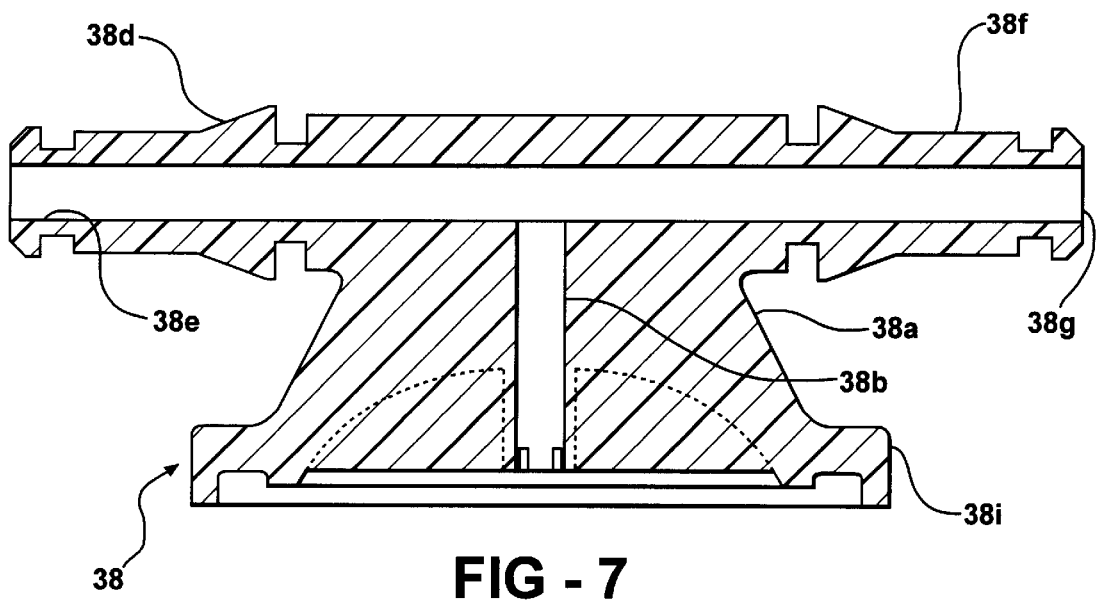

The stop structure of the invention effectively limits the upward excursion of the elastomeric diaphragm in response to the applied vacuum to an excursion magnitude well within the elastic limit of the diaphragm, whereby to preclude permanent stretching and resultant disabling of the diaphragm. This upward limiting action is provided by the lower end 38n of the tube structure and by the lower edges 38p of the ribs, and the apertures or slots 38m allow the volume of the chamber above the diaphragm to be totally evacuated and thereafter totally filled with hydraulic fluid irrespective of the upward deflection of the diaphragm to the point of closing off the lower end of the tubular structure as seen by the dash lines in FIG. 3. Specifically, slots 38m provide communication between the interior of the tube structure and the chamber, whereby to maintain communication between the damper port and the chamber, even with the elastomeric diaphragm pulled upwardly into a position totally closing the free lower end of the tube structure. The circumferentially spaced ribs 38k will be seen not only to coact with the stop structure to limit the upward excursion of the elastomeric diaphragm but will also be seen to significantly structurally strengthen the housing 38.

Figure 8:
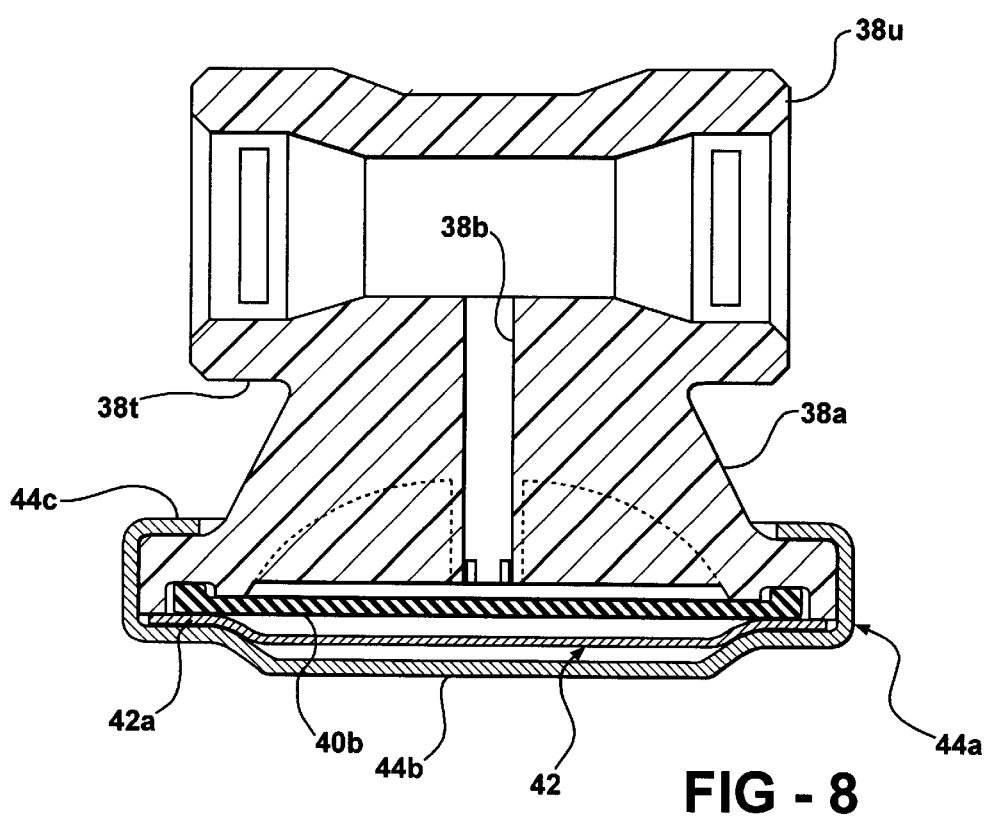
FIG. 8 is a cross-sectional view of a modified embodiment of the invention damper.

The modified embodiment of the invention damper seen in FIG. 8 is identical to the damper of FIGS. 1–7 with the exception that the male inlet and outlet fittings 38d and 38f of the FIGS. 1–7 embodiment are replaced with female inlet and outlet fittings 38t and 38u which coact, in known manner, with male fittings carried on the respective coacting ends of the conduit portions 14a and 14b.

The invention damper will be seen to be effective to damper the low frequency vibrations typically appearing at the clutch pedal during engine idle conditions with the transmission in neutral as well as the high frequency vibrations appearing in the system during engagement and disengagement of the clutch during normal driving, and will further be seen to insure total filling of the damper with hydraulic fluid in response to the evacuation and filling of the overall clutch actuator system.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A damper for provision in a hydraulic actuator system between a master cylinder and a slave cylinder of the system, the damper including a housing including a port for connection in the system and a diaphragm carried by the housing and coacting with the housing to define a chamber above the diaphragm and in communication with the port so that the diaphragm may deflect in response to vibrations transmitted through the hydraulic fluid in the system to effect damping of the vibrations, characterized in that:

the diaphragm is formed of an elastomeric material;

the damper further includes a stop structure fixed relative to the housing and positioned in the chamber in confronting relation to the diaphragm and operative to limit upward excursions of the diaphragm into the chamber to excursions within the elastic limit of the diaphragm, whereby to preclude permanent stretching of the diaphragm; and the stop structure includes aperture means providing communication between the port and the chamber irrespective of the position of the diaphragm relative to the stop structure, whereby to allow total evacuation of the chamber and subsequent total filling of the chamber.

2. A damper according to claim 1 wherein:

the stop structure comprises a tube communicating at an upper end thereof with the port, extending downwardly into the chamber, and including a free lower end positioned proximate the diaphragm; and the aperture means includes apertures in the tube communicating the interior of the tube with the chamber whereby to maintain communication between the port and the chamber even with the elastomeric diaphragm pulled upwardly into a position closing the free end of the tube.

3. A damper according to claim 2 wherein the damper further includes a plurality of circumferentially spaced ribs extending radially outwardly from the tube and each defining a lower edge substantially level with the free end of the tube whereby to further limit upward excursions of the diaphragm.

4. A damper according to claim 3 wherein:

the damper comprises a dual action damper wherein the elastomeric diaphragm deflects in response to low frequency vibrations transmitted through the hydraulic fluid in the system to effect damping of the low frequency vibration; and the damper includes a further relatively stiff diaphragm carried by the housing and positioned proximate a lower face of the elastomeric diaphragm so as to form a back-up for the elastomeric diaphragm so that the elastomeric diaphragm deforms against the further diaphragm in response to high frequency vibrations transmitted through the hydraulic fluid to cause deflection of the further diaphragm to effect damping of the high frequency vibrations.

5. A damper according to claim 4 wherein the further diaphragm is a spring steel diaphragm.

6. A damper according to claim 1 wherein the chamber has a domed configuration.

7. A damper according to claim 6 wherein the stop structure comprises a tube communicating at an upper end thereof with the port, extending downwardly into the domed chamber, and including a free lower end positioned proximate the damper.

8. A damper according to claim 7 wherein the damper further includes a plurality of circumferentially spaced ribs extending radially outwardly from the tube and each defining a lower edge substantially level with the free lower end of the tube.

9. A damper according to claim 8 wherein the aperture means includes a plurality of circumferentially spaced apertures in the tube proximate the lower end of the tube.

10. A damper according to claim 9 wherein each aperture comprises a downwardly opening slot formed in the lower end of the tube between adjacent ribs.

11. A clutch hydraulic actuator system having a vibration damper provided in the system between a master cylinder and a slave cylinder of the system, the damper including:

a housing including a port for connection in the system;

an elastomeric diaphragm carried by the housing and coacting with the housing to define a chamber above the elastomeric diaphragm in communication with the port so that the diaphragm may deflect in response to vibrations transmitted through the hydraulic fluid in the system to effect damping of the vibrations;

a stop structure positioned in the chamber in confronting relation to the diaphragm and operative to limit upward excursions of the diaphragm into the chamber to excursions within the elastic limit of the diaphragm, whereby to preclude permanent stretching of the diaphragm; and aperture means in the stop structure providing communication between the port means and the chamber irrespective of the position of the diaphragm relative to the stop structure, whereby to allow total evacuation of the chamber and subsequent total filling of the chamber.

12. A system according to claim 11 wherein:

the stop structure comprises a tube communicating at an upper end thereof with the port, extending downwardly into the chamber, and including a free lower end positioned proximate the diaphragm; and the aperture means includes apertures in the tube communicating the interior of the tube with the chamber whereby to maintain communication between the port and the chamber even with the elastomeric diaphragm pulled upwardly into a position closing the free end of the tube.

13. A system according to claim 12 wherein:

the damper further includes a plurality of circumferentially spaced ribs extending radially outwardly from the tube and each defining a lower edge substantially level with the free lower end of the tube whereby to further limit upward excursions of the diaphragm.

14. A system according to claim 13 wherein:

the damper comprises a dual action damper wherein the elastomeric diaphragm deflects in response to low frequency vibrations transmitted through the hydraulic fluid in the system to effect damping of the low frequency vibrations; and the damper includes a further relatively stiff diaphragm carried by the housing and positioned proximate a lower face of the elastomeric diaphragm so as to form a backup for the elastomeric diaphragm so that the elastomeric diaphragm deforms against the further diaphragm in response to high frequency vibrations transmitted through the hydraulic fluid to cause deflection of the further diaphragm to effect damping of the high frequency vibrations.

15. A system according to claim 14 wherein the further diaphragm is a spring steel diaphragm.

16. A system according to claim 11 wherein the chamber has a domed configuration.

17. A system according to claim 16 wherein the stop structure comprises a tube communicating at an upper end thereof with the port, extending downwardly into the chamber, and including a free lower end positioned proximate the elastomeric diaphragm.

18. A system according to claim 17 wherein the damper further includes a plurality of circumferentially spaced ribs extending radially outwardly from the tube and each defining a lower edge substantially level with the lower end of the tube.

19. A system according to claim 18 wherein the aperture means includes a plurality of circumferentially spaced apertures in the tube proximate the lower end of the tube.

20. A system according to claim 19 wherein each aperture comprises a downwardly opening slot formed in the lower end of the tube between adjacent ribs.

* * * * *